(12) United States Patent
Zarakowski et al.

(10) Patent No.: US 11,810,335 B2
(45) Date of Patent: Nov. 7, 2023

(54) METADATA FOR EMBEDDED BINARY DATA IN VIDEO CONTAINERS

(71) Applicant: International Business Machines Corporation, Armonk, NY (US)

(72) Inventors: Michal Zarakowski, Cracow (PL); Bartlomiej Stanislaw Filipek, Filipowice (PL); Maciej Snopczynski, Cracow (PL); Karol Oleszek, Giebultow (PL)

(73) Assignee: International Business Machines Corporation, Armonk, NY (US)

(*) Notice: Subject to any disclaimer, the term of this patent is extended or adjusted under 35 U.S.C. 154(b) by 508 days.

(21) Appl. No.: 17/176,249

(22) Filed: Feb. 16, 2021

(65) Prior Publication Data

US 2022/0261588 A1    Aug. 18, 2022

(51) Int. Cl.
 *G06V 10/25* (2022.01)
 *H04N 5/765* (2006.01)
 *G06F 8/36* (2018.01)

(52) U.S. Cl.
 CPC ............. *G06V 10/25* (2022.01); *G06F 8/36* (2013.01); *H04N 5/765* (2013.01)

(58) Field of Classification Search
 CPC .......... G06V 10/25; G06F 8/36; H04N 5/765; H04N 21/8153; H04N 21/845; H04N 9/8205

See application file for complete search history.

(56) References Cited

U.S. PATENT DOCUMENTS

| | | |
|---|---|---|
| 7,711,722 B1 | 5/2010 | Sahasi |
| 2004/0071453 A1 | 4/2004 | Valderas |
| 2005/0044499 A1 | 2/2005 | Allen |
| 2009/0300686 A1* | 12/2009 | Quigley ........... H04N 21/25833 725/62 |
| 2009/0307258 A1 | 12/2009 | Priyadarshi |
| 2020/0092600 A1* | 3/2020 | Di .................. H04N 21/440245 |
| 2020/0285615 A1* | 9/2020 | Velmurugan ........... H04L 67/02 |
| 2021/0320962 A1* | 10/2021 | Oh ......................... H04L 65/70 |
| 2022/0256131 A1* | 8/2022 | Oh ....................... H04N 19/184 |

OTHER PUBLICATIONS

"Matroska Attachments", Copyright® 2005-2020 Matroska, printed on Jan. 4, 2021, 2 pages, <https://www.matroska.org/technical/attachments.html>.
Erol et al., "Linking Multimedia Presentations with their Symbolic Source Documents: Algorithm and Applications", ACM Multimedia '03, Nov. 2-8, 2003, Berkeley, CA, Copyright 2003 ACM 1-58113-722-2/03/0011, 10 pages.
(Continued)

*Primary Examiner* — Edward F Urban
*Assistant Examiner* — Wassim Mahrouka
(74) *Attorney, Agent, or Firm* — Stephen R. Yoder

(57) ABSTRACT

Video containers are expanded to encapsulate auxiliary data and metadata linking video content with relevant portions of auxiliary data for download during playback of particular video content. Auxiliary data is parsed into areas of interest and associated with the video content including the same areas of interest. During playback a viewer is provided access to relevant portions of the auxiliary data according to the encapsulated metadata describing the relevant portions.

19 Claims, 2 Drawing Sheets

(56) References Cited

OTHER PUBLICATIONS

Mavlankar et al., "An Interactive Region-Of-Interest Video Streaming System for Online Lecture Viewing", Information Systems Laboratory, Department of Electrical Engineering, Stanford University, Stanford, CA 94305, USA, 8 pages.

Schoning et al., "Providing Video Annotations in Multimedia Containers for Visualization and Research", 2017 IEEE Winter Conference on Applications of Computer Vision, 10 pages.

* cited by examiner

METADATA FOR EMBEDDED BINARY DATA IN VIDEO CONTAINERS

BACKGROUND

The present invention relates generally to the field of video containers, and more particularly to embedded binary data in video containers.

A video container format, sometimes called a wrapper, is a class of computer files that exist to allow multiple data streams to be embedded into a single file along with metadata for identifying and further detailing the data streams. Notable examples of video container formats include archive files (such as the ZIP format) and multimedia playback files (such as Matroska, MP4, and AVI). (Note: the term(s) "ZIP," "MATROSKA," "MP4," and/or "AVI" may be subject to trademark rights in various jurisdictions throughout the world and are used here only in reference to the products or services properly denominated by the marks to the extent that such trademark rights may exist.)

Video container formats are often used to identify and interleave different data types. Simple container formats often contain different types of audio formats, while advanced container formats tend to support multiple audio and video streams, subtitles, chapter-information, and metadata tags and the synchronization information needed to play back the various streams together. Oftentimes, the file header, most of the metadata, and the synchro chunks are each specified by the particular container format. For example, container formats exist for optimized, low-quality, internet video streaming and they differ from high-quality Blu-ray streaming requirements. (Note: the term(s) "BLU-RAY" may be subject to trademark rights in various jurisdictions throughout the world and are used here only in reference to the products or services properly denominated by the marks to the extent that such trademark rights may exist.)

Video container formats interleave data in media streams to enable playback using less computational resources, such as time spent reading from the storage drive, memory needed to buffer selected media streams, and time spent decoding when seeking to a different position in time. Multiplexing overhead is the control information added by the container to carry interleaved streams. Smaller overhead is indicated by a relatively smaller file carrying the same streams with the same data as other larger files.

SUMMARY

In one aspect of the present invention, a method, a computer program product, and a system includes: (i) receiving a video recording and an auxiliary item associated with the video recording; (ii) identifying a set of video frames from the video recording, the set of video frames associated with an area of interest; (iii) identifying a portion of content within the auxiliary item associated with the area of interest; (iv) generating a set of metadata representing the area of interest, the set of metadata describing the portion of content for selection during playback of the video recording; and (v) encapsulating a video container of the video recording with the auxiliary item, the portion of content, and the set of metadata. During playback of the set of video frames, providing access to the portion of content based on the set of metadata.

DETAILED DESCRIPTION

Figure 1:
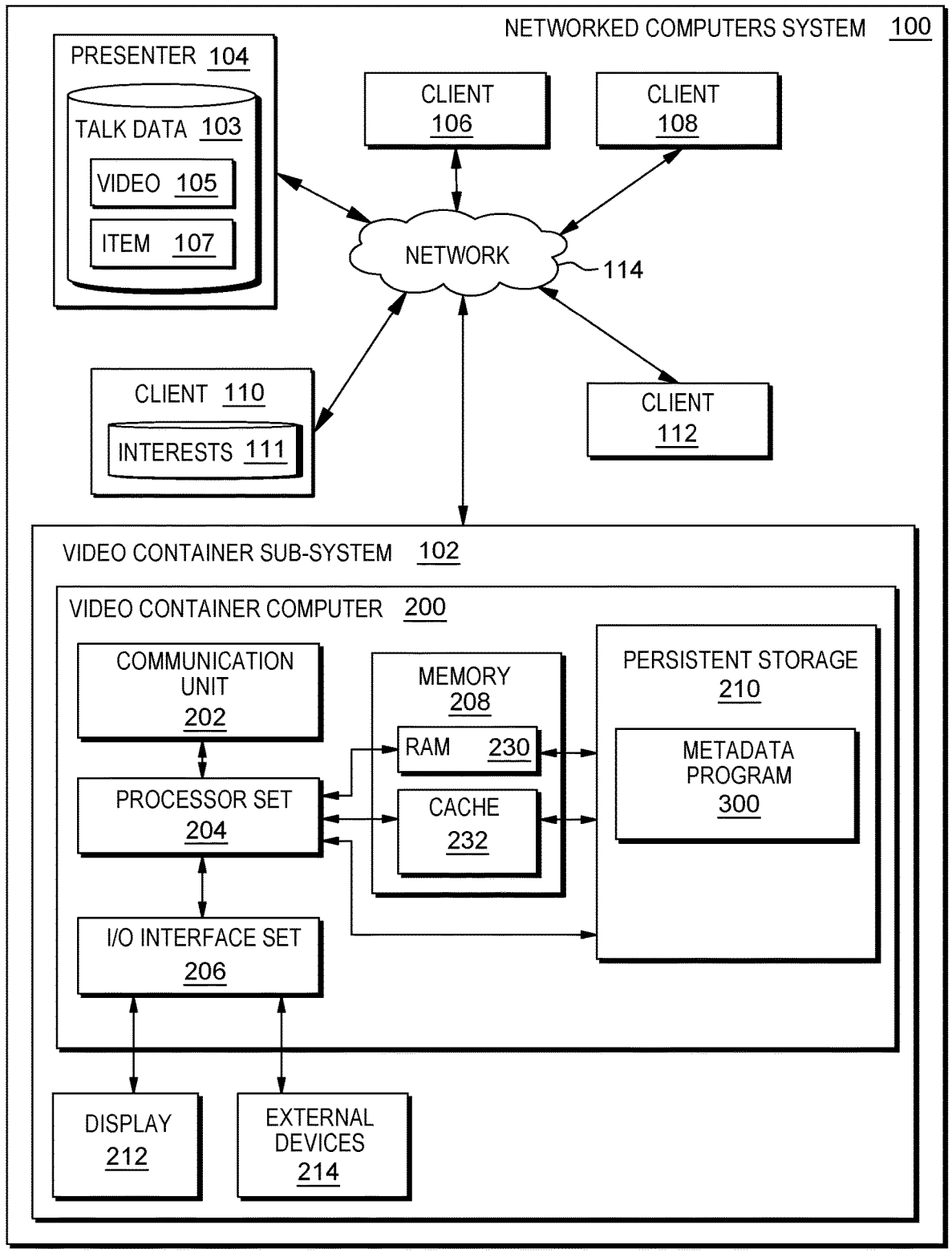
FIG. 1 is a schematic view of a first embodiment of a system according to the present invention.

Video containers are expanded to encapsulate auxiliary data and metadata linking video content with relevant portions of auxiliary data for download during playback of particular video content. Auxiliary data is parsed into areas of interest and associated with the video content including the same areas of interest. During playback a viewer is provided access to relevant portions of the auxiliary data according to the encapsulated metadata describing the relevant portions.

Presentations, speeches, and lectures, referred to herein as simply "talks," often take place live in front of an audience but are also available by streaming and/or video download. Oftentimes a talk includes the use of auxiliary materials such as slide decks or sample source code illustrations displayed during the talk. The auxiliary material is available for download via a separate link provided to the users.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: video container sub-system 102; presenter sub-system 104; client sub-systems 106, 108, 110, 112; talk data store 103; video recording file 105; auxiliary item file 107; areas of interest store 111; communication network 114; video container computer 200; communication unit 202; processor set 204; input/output (I/O) interface set 206; memory device 208; persistent storage device 210; display device 212; external device set 214; random access memory (RAM) devices 230; cache memory device 232; and metadata program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Metadata program 300 operates to generate metadata describing content-specific portions of auxiliary data such as presentation slides. The content-specific portions are associated with a video recording such as a video of the presentation slides being discussed. The metadata providing for individual slide access during playback of corresponding portions of the video recording. Metadata and corresponding auxiliary data and/or components of the auxiliary data are encapsulated with the video container.

Some embodiments of the present invention recognize the following facts, potential problems and/or potential areas for improvement with respect to the current state of the art: (i) current DVD standards do not define the detailed metadata definition for embedded data; (ii) conventional use of metadata in video containers is to merely extract textual content of a full artifact, such as a full slide presentation, from a video recording; (iii) it is known to determine content of frames within a video file; and/or (iv) extraction of metadata from a presentation is known.

Some embodiments of the present invention are directed to an extension to video container formats (such as 3GPP, ASF, AVI, Matroska, MPEG, QTFF, and WebM). The extension allows a user to encapsulate binary data attachments such as presentation files, source code files, and image files for use on demand in multiple forms during playback of the video.

Some embodiments of the present invention are directed to additional metadata description of the embedded binary data. The additional metadata may describe, for example, the format, type, size, and length of an attached auxiliary item such as a slide or piece of source code. Further, the metadata may describe the reference how it reflects the state currently visible on the screen or describe which auxiliary item is discussed or displayed at certain index times during video playback.

For example, a single slide from a slide deck may have additional properties including, but not limited to: (i) the playback time, or index time, when the single slide appears on the screen in the video recording; (ii) duration in which the single slide remains on the screen; and/or (iii) the playback time, or index time, when the single slide is no longer shown on the screen. In that way, a user may download the particular slide that is being discussed during playback of the video. The video player can draw from the metadata to read just that slide from the embedded data.

Figure 2:
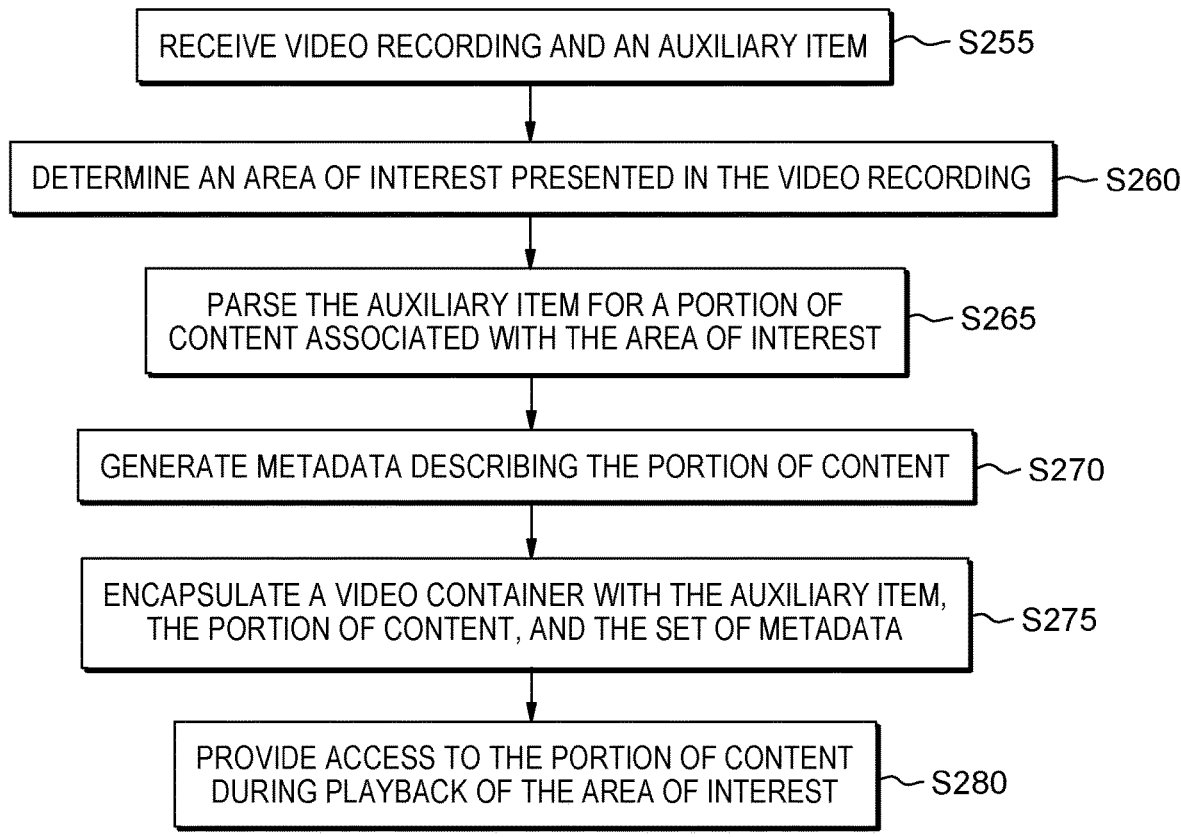
FIG. 2 is a flowchart showing a method performed, at least in part, by the first embodiment system.
Figure 3:
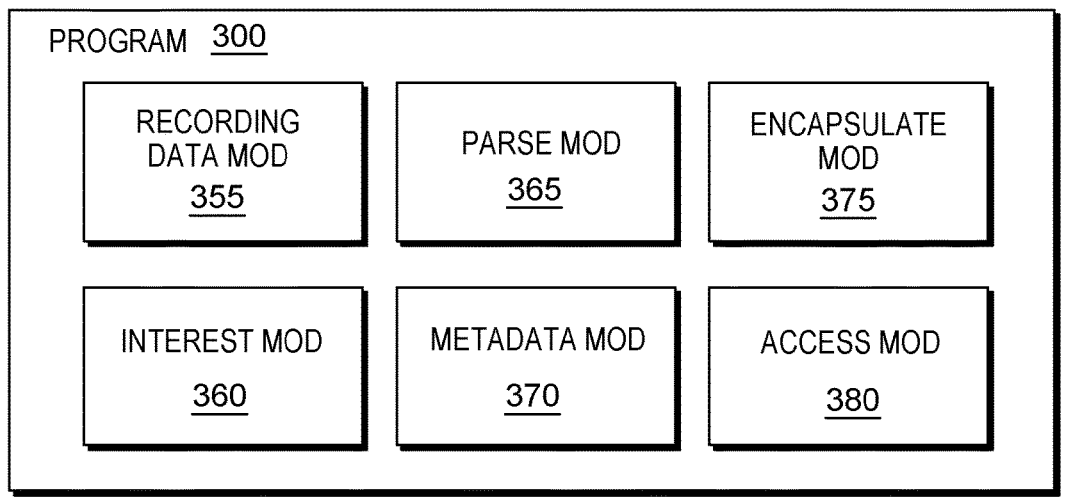
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where recording data module ("mod") 355 receives video recording files and associated auxiliary item files referred to and/or displayed during video. Auxiliary materials are items an audience may hear about or see while replaying the video such as: (i) presentation slides; (ii) published articles; (iii) application source code in a programming language; (iv) images whether digitally displayed or hard copies presented by hand (photos, artwork, fliers); (v) books in electronic format; (vi) educational video textbooks; (vii) digital audio/video recordings; and/or (viii) URLs referenced in the presentation. In this example, the video recording includes a speaker presenting a talk that covers an area of interest. The talk data store 103 of presenter sub-system 104 includes video recording file 105 and auxiliary item file 107 (FIG. 1).

Processing proceeds to step S260, where interest mod 360 determines an area of interest presented in the video recording. Specific areas of interest are identified based on the areas of interest covered on the video recording. Some areas of interest are identified for later reference with respect to the auxiliary materials as will be discussed in detail below. Areas of interest may include: (i) presentation slide number; (ii) application source code portion; (iii) subject matter; (iv) topic; and/or (v) keyword. In this example, areas of interest are pre-defined at client sub-system 110 where interests are stored in areas of interest store 111 (FIG. 1). The interest mod determines which, if any, areas of interest are disclosed during video recorded talk. Alternatively, a list of areas of interest is generated during playback of the video.

Processing proceeds to step S265, where parse mod 365 parses the auxiliary item for a portion of content associated with the area of interest. For a given area of interest, the auxiliary items is parsed for portions of content dealing with the area of interest. In this example, each auxiliary item is parsed for discreet portions that relate to certain areas of interest identified in the video at step S260. In some cases, a single image would not be parsed but a slide deck would be parsed by individual slides or groups of slides dealing with a same area of interest. Where an area of interest in a video recording is determined in step S260, the corresponding auxiliary item, or portion thereof, dealing with the area of interest is associated with the area of interest. The result of establishing associations may be that a flier, a range of slides within a slide deck, and a portion of source code are each associated with a single area of interest. That is, multiple auxiliary items, whether full copies or portions of parsed copies, may be associated with a single area of interest.

In some embodiments of the present invention, corresponding video frames are identified by certain properties including: (i) playback time in the video when the area of interest is first displayed or presented; (ii) duration the area of interest remains a topic of discussion from the playback time; (iii) duration from the playback time that the area of interest is displayed for viewing; (iv) playback time in which the area of interest in no longer displayed or presented; (v) playback time for each instance during the video that a particular area of interest begins to be discussed; and/or (vi) duration after each playback time that the particular area of interest is discussed.

Processing proceeds to step S270, where metadata mod 370 generates metadata describing the associated portion of content of the auxiliary item. By generating metadata describing portions of the auxiliary item associated with the video recording, the portions of content may be presented for access when the corresponding area of interest is presented on the video recording. According to some embodiments of the present invention, the properties are recorded as metadata to allow the program to identify auxiliary content where an area of interest is covered. As described in more detail below, for example, if the auxiliary items is Java source code, even if only a few lines of code are presented on the video, the metadata may describe the few lines and/or may describe more generally the method containing the few lines, the class containing the record, the full line, or the full package. In that way, the generated metadata establishes described portions of the auxiliary content for later selective access to portions of the content which are defined by area of interest.

Processing proceeds to step S275, where encapsulate mod 375 encapsulates a video container with auxiliary data including the set of metadata. Encapsulation provides for individual selection of an auxiliary item or portions thereof related to an area of interest upon playback of video frames dealing with the area of interest. A parsed auxiliary item may be encapsulated with metadata describing the various portions that were parsed with respect to areas of interest such that a portion of the auxiliary item is individually available to a user. Alternatively, the parsed portions are stored as auxiliary data along with corresponding metadata describing the portions. For example, a slide deck may be encapsulated with a video recording as sub-sets of one or more slides related to a particular area of interest.

Processing ends at step S280, where access mod 380, provides access to the portion of content during playback of video frames associated with the area of interest. A very simplistic example is when a third slide of a slide deck is directed to the area of interest. Whenever the third slide is displayed and/or mentioned during playback of the video recording the third slide is provided for selection and download by the viewer. In this case, slide three would be parsed from the slide deck and made available individually. Other examples include providing access to image files for images presented by the speaker during playback of the video. The image being determined in step S260 to be an area of interest.

Further embodiments of the present invention are discussed in the paragraphs that follow.

According to some embodiments of the present invention, files displayed during a video presentation are made available at any time during the video playback as a full presentation and/or as a single slide displayed at a particular time or a Java class is made available while a line of code is displayed on the screen.

The example that follows involves a recorded video that where a presentation with an audience present and a speaker on a stage is recorded by a video camera. The video camera records the event with some images of the presentation display screen, the speaker, and the audience along with audio of the event. During the presentation, the speaker displays a series of slides from a slide deck and the speaker also displays source code of a sample program from a separate screen while on the stage. The recorded video is available for download with a video container format that supports extended metadata and binary storage. Using commercially available software the following input is prepared: (i) recorded video made during the presentation; (ii) the slide deck file used for the presentation; and (iii) the source code file displayed during the presentation. The commercially available software uses several processing techniques for the image such as OCR (optical character recognition) and audio files to match the content from the slide deck and the source code to what is visible and/or heard during playback of the recorded video.

According to some embodiments of the present invention, the input is processed to amend a video container wherein: (i) the slide deck is divided into individual slides; (ii) each slide is assigned a set of properties including: (a) index time when the slide is displayed on the screen; (b) duration the slide remains on the screen; and (c) index time in which the slide is no longer displayed; and (iii) source code is also parsed and matched with the recording similar to the slides of the slide deck, but using a processor that understands programming language. The metadata for the parsed source code may include: (a) index time when it starts being on the screen; (b) duration of display on the computer; and/or (c)

time of disappearing. For the case of Java programming language, metadata may include: (a) a particular Java file; (b) Java class; and/or (c) method or similar language-specific artifacts are described.

Some embodiments of the present invention amend the video container to include the property of duration that the slide is discussed during the recording or the property of duration that the source code is discussed.

When all metadata information is generated, the video player can allow a user to save a slide being displayed during video playback and/or save a portion of source code being discussed during playback.

The saved slide can be in a form of a slide deck format, a raster image, or other preferred format. The source code that is saved may be the complete file, only a class, or only a method or similar language-specific artifact of the source code.

Some embodiments of the present invention are directed to the notion of metadata that can precisely define narrowed scope of embedded binary data and correlate it with the timing of related video playback. In the example, the source code is stored inside a video container and the metadata describes the source code with information such as particular lines, source methods, classes, and packages of the source code file and/or archive.

Some embodiments of the present invention are directed to applying detailed descriptive metadata for the video and matching index times of the video to portions of a slide presentation.

Some embodiments of the present invention enhance the way of providing portions of artifacts to an end user by making accessible more than just slide deck content but specific portions of relevant content regardless of currently displayed materials.

Some embodiments of the present invention are directed to a process for enhancing the interactivity of recorded presentations including: (i) receiving a video file and a slide deck associated with the video file; (ii) parsing the video file into a set of frames; (iii) parsing the slide deck into a set of slides; (iv) determining one or more areas of interest within at least one frame of the set of frames; (v) identifying a slide within the set of slides that is associated with the at least one frame; (vi) generating, at least from the slide, a set of metadata representing the one or more areas of interest; (vii) storing the set of metadata with the slide; (viii) receiving a user request for at least a portion of the set of metadata; and (ix) delivering the metadata to the user.

Some embodiments of the present invention generate metadata by extracting data from at least one frame of a video file.

Some embodiments of the present invention are directed to a process for enhancing the interactivity of recorded presentations including: (i) receiving a video file and a slide deck associated with the video file; (ii) parsing the video file into a set of frames; (iii) parsing the slide deck into a set of slides; (iv) determining one or more areas of interest within at least one frame of the set of frames; (v) identifying a slide within the set of slides that is associated with the at least one frame; and (vi) generating, at least from the slide, a set of metadata representing the one or more areas of interest. Wherein the one or more areas of interest includes a representation of a set of computer program instructions, and wherein delivering the metadata includes opening the set of computer program instructions within a computer programming environment native to the set of computer program instructions.

Some embodiments of the present invention may include one, or more, of the following features, characteristics and/or advantages: (i) provides sample files and/or slide decks together with a video file where the files and/or slide decks are presented; (ii) related files are made available at any time during video playback; (iii) expand on the concept of enhancing video content with metadata by providing descriptors for extracting parts out of the attachments in which the user is interested; (iv) support extraction of the portions of an attachment based on a precise metadata descriptions of the video file and corresponding attached files; (v) generated metadata describes precisely the attached content for data extraction; and/or (vi) refers to video container metadata during playback and reacts interactively with user input during playback.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving a video recording and an auxiliary item associated with the video recording;
   identifying a set of video frames from the video recording, the set of video frames associated with an area of interest;
   identifying a portion of content within the auxiliary item associated with the area of interest;
   generating a set of metadata representing the area of interest, the set of metadata describing the portion of content for selection during playback of the video recording;

encapsulating a video container of the video recording with the auxiliary item, the portion of content, and the set of metadata;
wherein:
during playback of the set of video frames, providing access to the portion of content based on the set of metadata.

2. The method of claim 1, wherein:
the auxiliary item is a source code archive of source code files presented on the video recording;
the area of interest is a line of source code of a single file of the source code archive; and
the portion of content is the line of source code.

3. The method of claim 2, wherein the set of metadata further represents:
a method containing the line of source code; and
a class containing the line of source code.

4. The method of claim 2, wherein the set of metadata further represents:
the single file containing the line of source code; and
the source code archive containing the single file.

5. The method of claim 1, further comprising:
during playback of the set of video frames, providing access to the auxiliary item.

6. The method of claim 1, wherein:
the video recording is of a presentation;
the auxiliary item is a set of slides displayed during the presentation; and
the set of video frames include a discussion of the area of interest, the discussion including display of the portion of content within the set of slides.

7. The method of claim 1, further comprising:
receiving a selection of the area of interest from a pre-defined list of areas of interest.

8. A computer program product comprising a computer-readable storage medium having a set of instructions stored therein which, when executed by a processor, causes the processor to perform a method comprising:
receiving a video recording and an auxiliary item associated with the video recording;
identifying a set of video frames from the video recording, the set of video frames associated with an area of interest;
identifying a portion of content within the auxiliary item associated with the area of interest;
generating a set of metadata representing the area of interest, the set of metadata describing the portion of content for selection during playback of the video recording;
encapsulating a video container of the video recording with the auxiliary item, the portion of content, and the set of metadata;
wherein:
during playback of the set of video frames, providing access to the portion of content based on the set of metadata.

9. The computer program product of claim 8, wherein:
the auxiliary item is a source code archive of source code files presented on the video recording;
the area of interest is a line of source code of a single file of the source code archive; and
the portion of content is the line of source code.

10. The computer program product of claim 9, wherein the set of metadata further represents:
a method containing the line of source code; and
a class containing the line of source code.

11. The computer program product of claim 8, further causing the processor to perform the method including:
during playback of the set of video frames, providing access to the auxiliary item.

12. The computer program product of claim 8, wherein:
the video recording is of a presentation;
the auxiliary item is a set of slides displayed during the presentation; and
the set of video frames include a discussion of the area of interest, the discussion including display of the portion of content within the set of slides.

13. The computer program product of claim 8, further causing the processor to perform the method including:
receiving a selection of the area of interest from a pre-defined list of areas of interest.

14. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method comprising:
receiving a video recording and an auxiliary item associated with the video recording;
identifying a set of video frames from the video recording, the set of video frames associated with an area of interest;
identifying a portion of content within the auxiliary item associated with the area of interest;
generating a set of metadata representing the area of interest, the set of metadata describing the portion of content for selection during playback of the video recording;
encapsulating a video container of the video recording with the auxiliary item, the portion of content, and the set of metadata;
wherein:
during playback of the set of video frames, providing access to the portion of content based on the set of metadata.

15. The computer system of claim 14, wherein:
the auxiliary item is a source code archive of source code files presented on the video recording;
the area of interest is a line of source code of a single file of the source code files; and
the portion of content is the line of source code.

16. The computer system of claim 15, wherein the set of metadata further represents:
a method containing the line of source code; and
a class containing the line of source code.

17. The computer system of claim 14, further causing the processor to perform the method including:
during playback of the set of video frames, providing access to the auxiliary item.

18. The computer system of claim 14, wherein:
the video recording is of a presentation;
the auxiliary item is a set of slides displayed during the presentation; and
the set of video frames include a discussion of the area of interest, the discussion including display of the portion of content within the set of slides.

19. The computer system of claim 14, further causing the processor to perform the method including:

receiving a selection of the area of interest from a predefined list of areas of interest.

\* \* \* \* \*